US008430301B2

(12) United States Patent
Tian et al.

(10) Patent No.: US 8,430,301 B2
(45) Date of Patent: Apr. 30, 2013

(54) DOCUMENT AUTHENTICATION USING HIERARCHICAL BARCODE STAMPS TO DETECT ALTERATIONS OF BARCODE

(75) Inventors: Yibin Tian, Menlo Park, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 711 days.

(21) Appl. No.: 12/624,407

(22) Filed: Nov. 23, 2009

(65) Prior Publication Data

US 2011/0121066 A1    May 26, 2011

(51) Int. Cl.
G06F 17/00 (2006.01)
G06F 3/12 (2006.01)
G06K 7/10 (2006.01)
G06K 9/00 (2006.01)
G05B 19/00 (2006.01)
H04L 9/32 (2006.01)

(52) U.S. Cl.
USPC ...... 235/375; 235/462.01; 713/176; 713/179; 713/189

(58) Field of Classification Search ............... 235/375, 235/462.01–462.49; 713/176, 179, 189; 340/5.86; 382/100; 358/1.15, 1.18, 3.28
See application file for complete search history.

(56) References Cited

U.S. PATENT DOCUMENTS

| 6,522,771 | B2 | 2/2003 | Rhoads |
| 6,611,598 | B1 | 8/2003 | Hayosh |
| 6,879,701 | B1 | 4/2005 | Rhoads |
| 7,013,024 | B2 * | 3/2006 | Cordery et al. ............... 382/101 |
| 7,107,453 | B2 | 9/2006 | Yen et al. |
| 7,152,047 | B1 | 12/2006 | Nagel |
| 7,158,654 | B2 | 1/2007 | Rhoads |
| 7,194,105 | B2 | 3/2007 | Hersch et al. |
| 7,234,645 | B2 | 6/2007 | Silverbrook et al. |
| 7,286,684 | B2 | 10/2007 | Rhoads et al. |
| 7,353,398 | B2 | 4/2008 | Kra |
| 7,394,573 | B1 | 7/2008 | Goldberg et al. |
| 7,444,000 | B2 | 10/2008 | Rhoads |
| 7,499,566 | B2 | 3/2009 | Rhoads |
| 7,564,992 | B2 | 7/2009 | Rhoads |
| 7,565,542 | B2 | 7/2009 | Silverbrook et al. |
| 2003/0223584 | A1 * | 12/2003 | Bradley et al. ............... 380/229 |
| 2005/0242568 | A1 | 11/2005 | Long et al. |
| 2008/0177799 | A1 | 7/2008 | Wilson |

\* cited by examiner

*Primary Examiner* — Michael G. Lee
*Assistant Examiner* — Laura Gudorf
(74) *Attorney, Agent, or Firm* — Chen Yoshimura LLP

(57) ABSTRACT

A method of generating a self-authenticating printed document and authenticating the printed document. The back side of the printed document contains 2d barcode which encode extracted features of the document content. The features are hashed into a hash code, converted to a barcode stamp element, and transformed into a hierarchical barcode stamp by repeating the stamp element. The hierarchical barcode stamp is printed as a gray background pattern on the front side of the same sheet of printed document. To authenticate the printed document, the barcodes on the back side are read to extract the document features. The features are hashed into a hash code and compared to the hash code extracted from the hierarchical barcode stamp on the front side of the document to detect any alterations of the back side barcodes. Further, the document features extracted from the front and back sides of the document are compared.

22 Claims, 3 Drawing Sheets

DOCUMENT AUTHENTICATION USING HIERARCHICAL BARCODE STAMPS TO DETECT ALTERATIONS OF BARCODE

BACKGROUND OF THE INVENTION

1. Field of the Invention

This invention relates to a document authentication method which uses barcodes to encode content of the document, and in particular, it relates to such a document authentication method in which hierarchical barcode stamps are used as a background pattern to reduce the impact of alteration of barcodes.

2. Description of Related Art

Barcode is a form of machine-readable symbology for encoding data, and has been widely introduced in a variety of application fields. Two-dimensional barcode (2d barcode) is one mode of such symbology. It can be used to encode text, numbers, images, and binary data streams in general, and has been used in identification cards, shipping labels, certificates and other documents, etc. Examples of widely used 2d barcode standards include PDF417 standard and QR Code®, and software and hardware products have been available to print and read such 2d barcodes.

Original digital documents, which may include text, graphics, images, etc., are often printed, and the printed hard copy are distributed, copied, etc., and then often scanned back into digital form. This is referred to as a closed-loop process. Authenticating a scanned digital document refers to determining whether the scanned document is an authentic copy of the original digital document, i.e., whether the document has been altered while it was in the hard copy form. Alteration may occur due to deliberate effort or accidental events. There are two approaches to authenticating a printed document. The first approach utilizes a database that stores original document images, and compares the scanned document image with the original image.

The second approach eliminates the dependency on a database of original images. In particular, methods have been developed to authenticate a printed document using two-dimensional (2d) barcode. Typically, such a method encodes the content of the original document, or other information extracted from the original document that can be used to authenticate the document (generally referred to as authentication information), in 2d barcode (referred to as authentication barcode). The barcode is printed on the same recording medium as the printed document, e.g., on the front or back side of the printed document. The content of the document may be a bitmap image of a page of the document, text, graphics or images contained within the document, or a mixture thereof. To authenticate a printed document bearing an authentication barcode, the document is scanned to obtain scanned data that represents the content of the document, e.g. a bitmap image, text extracted by using an optical character recognition (OCR) technology, etc. The authentication barcode is also scanned and the data contained therein (the authentication data) is extracted. The scanned data is then compared to the authentication data to determine if any part of the printed document has been altered since it was originally printed, i.e. whether the document is authentic. Some authentication technologies merely determine whether any alterations have occurred, some are able to determine what content has been altered and what the alterations are. A printed document bearing authentication barcode is said to be self-authenticating because no information other than what is on the printed document is required to authenticate its content.

SUMMARY

In a self-authenticating document bearing 2d barcode, the barcode itself is vulnerable to alterations after the document is released. Accordingly, the present invention is directed to a document authentication method and related apparatus that substantially obviates one or more of the problems due to limitations and disadvantages of the related art.

An object of the present invention is to provide a document authentication method which allows any alterations of the authentication barcodes to be detected.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing and printing system for generating a self-authenticating printed document, which includes: (a) obtaining an original document image; (b) processing the original document image to generate processed data; (c) generating first barcode stamps which encode the processed data generated in step (b); (d) generating a hierarchical barcode stamp by repeating a barcode stamp element in accordance with a pre-defined pattern, the barcode stamp element encoding a code calculated from the processed data generated in step (b); (e) printing the hierarchical barcode stamp and the original document image on a front side of a recording medium, and printing the first barcode stamps on a front or back side of the same recording medium to generate the printed document.

In another aspect, the present invention provides a method implemented in a data processing system for authenticating a printed document, the printed document including a hierarchical barcode stamp and a document image printed on a front side of a recording medium and first barcode stamps printed on a front or back side of the same recording medium, the method including: (a) obtaining a front side image and a back side image from the printed document; (b) extracting the document image and the hierarchical barcode stamp from the front side image; (c) processing the document image extracted in step (b) to obtain first processed data; (d) extracting a first code from the hierarchical barcode stamp extracted in step (b); (e) reading and decoding the first barcode stamps in the front side image and/or the back side image to obtain second processed data encoded therein; (f) calculating a second code from the second processed data; (g) comparing the first code and the second code to determine whether the first barcode stamps have been altered; and (h) comparing first processed data and second processed data to determine whether the printed document has been altered.

In another aspect, the present invention provides computer program products that cause a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method of generating a self-authenticating printed document and then authenticating the printed document. The self-authenticating document has 2d barcode stamps on its back (or front) side which encode the document image or features extracted from the content of the document on the front side of the document. To enhance the security of the 2d barcode, the document image or extracted features of the document, optionally combined with desired metadata, is hashed into a reasonably short hash code, and converted to a 2d barcode stamp element. The stamp element is then transformed into a hierarchical barcode stamp by repeating the stamp element according to a pre-defined pattern, which may be accomplished by using a Kronecker product matrix operation. The hierarchical barcode stamp is printed as a background pattern (such as a gray pattern) for the front side of the printed document; the image of the document is printed over this background pattern. The front side image and back side image (if any) are printed on a single sheet of recording medium to be circulated.

To authenticate the printed document, the data (extracted features, compressed image, etc.) encoded in the 2d barcode on the back (or front) side is extracted and hashed into a hash code, and compared to the hash code extracted from the hierarchical bar code on the front side of the document. This helps to determine whether the 2d barcode on the back (or front) side of the document has been altered.

The 2d barcode may be printed on the front and/or back side of the printed document. Generally speaking, if the 2d barcode encodes a relatively small amount of data, such as extracted text, then the 2d barcode may be printed on the front side of the document because the number of 2d barcode stamps will be relatively small. If the 2d barcode encodes the original document image, then the number of 2d barcode stamps will be relatively large, and it may not be practical to print all of the 2d barcode on the front side. In the embodiments description below, the 2d barcode is printed on the back side, although it should be understood that it can also be printed on the front side or printed on the front side and the back side.

Figure 1:
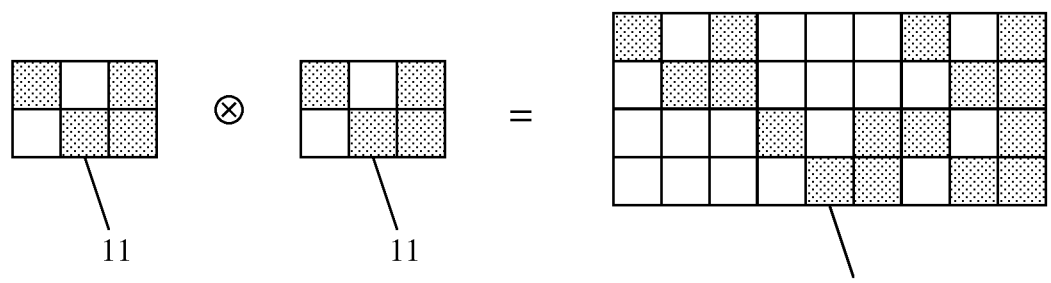
FIG. 1 illustrates an example of generating a hierarchical barcode stamp using a Kronecker product operation.

The Kronecker product, denoted by ⊗, is an operation on two matrices resulting in a block matrix. If A is an m×n matrix and B is a p×q matrix, the Kronecker product A⊗B is an mp×nq matrix. FIG. 1 illustrates a stamp element 11 and the Kronecker product (hierarchical barcode) 12 of the stamp element 11 and itself. The Kronecker product in this example may be expressed in matrix form as follows:

$$\begin{pmatrix} 1 & 0 & 1 \\ 0 & 1 & 1 \end{pmatrix} \otimes \begin{pmatrix} 1 & 0 & 1 \\ 0 & 1 & 1 \end{pmatrix} = \begin{pmatrix} 1 & 0 & 1 & 0 & 0 & 0 & 1 & 0 & 1 \\ 0 & 1 & 1 & 0 & 0 & 0 & 0 & 1 & 1 \\ 0 & 0 & 0 & 1 & 0 & 1 & 1 & 0 & 1 \\ 0 & 0 & 0 & 0 & 1 & 1 & 0 & 1 & 1 \end{pmatrix}$$

In this example, the stamp element is an m×n=3×2 matrix and the Kronecker product of the stamp element and itself is an $m^2 \times n^2 = 9 \times 4$ matrix.

A hierarchical barcode may also be generated by forming a Kronecker product of a stamp element with a pre-defined matrix. In other words, such a hierarchical barcode is formed by repeating a stamp element in a pre-defined manner. For example, the pre-defined matrix may be $$(1 \ 0 \ 1),$$

$$\begin{pmatrix} 1 \\ 1 \\ 1 \end{pmatrix},$$

or $$\begin{pmatrix} 1 & 0 \\ 0 & 1 \end{pmatrix},$$

etc.

While the Kronecker product operation is a convenient way to generate a hierarchical barcode, a hierarchical barcode can be generated in other suitable ways. More generally, a hierarchical barcode is generated by repeating a stamp element according to a pre-defined pattern. The number of repetitions does not have to be an integer number; for example, due to the size of the recording medium, the last repetition of the stamp element may include only a portion of the entire stamp element. Also, it is permissible to have blank spaces of a desired width between repeating stamp elements. A hierarchical barcode can include any such patterns as long as the stamp element is repeated. In the descriptions below, the Kronecker product operation is used as an example for generating a hierarchical barcode.

Figure 2:
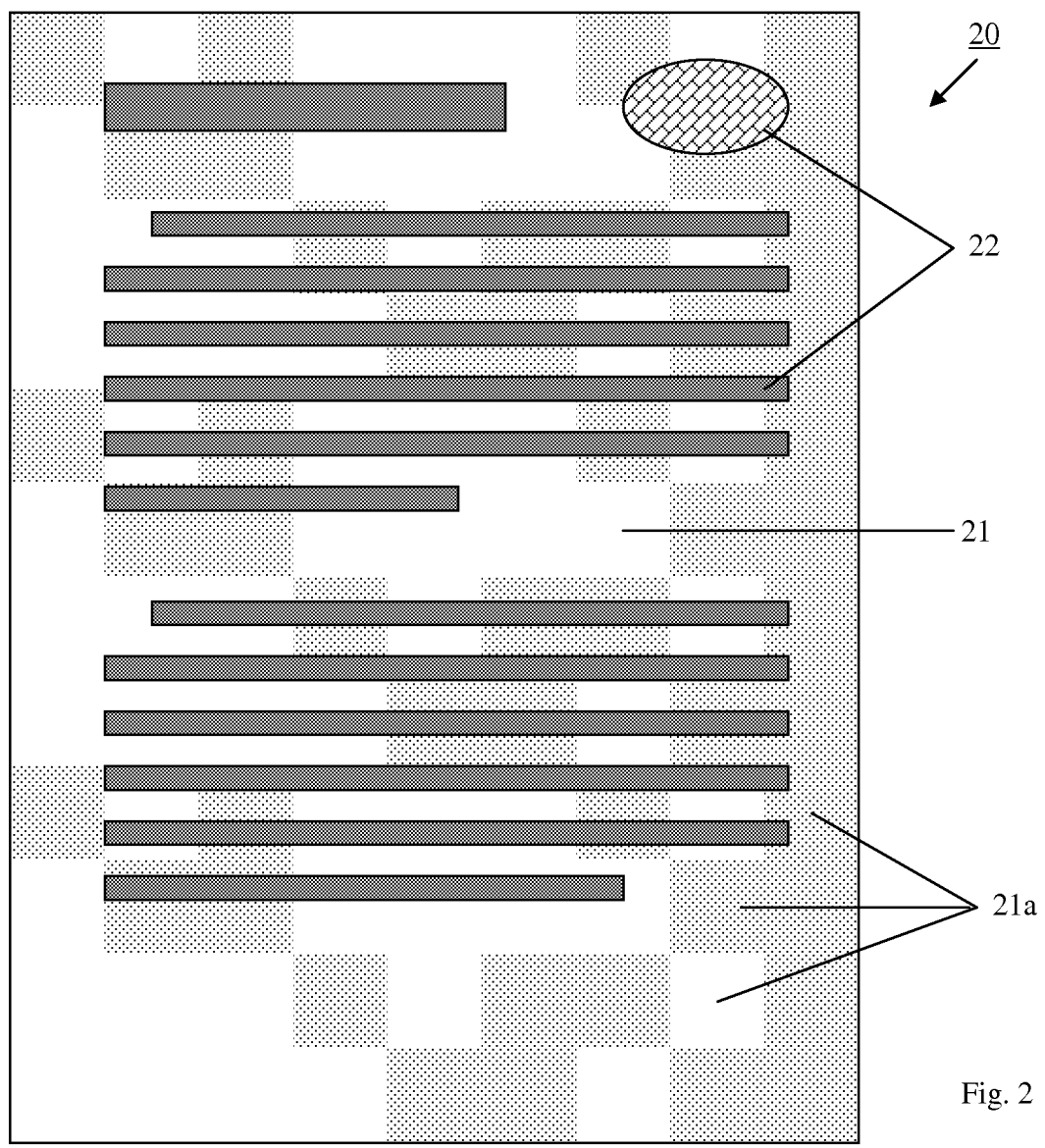
FIG. 2 illustrates a front side of printed document having a barcode pattern as background according to an embodiment of the present invention.

FIG. 2 illustrates a front side of a document 20 bearing a hierarchical barcode 21 as a background pattern. Each tile 21a of the hierarchical barcode 21 represents a binary value. The hierarchical barcode is printed in a gray tone; in other words, each barcode tile 21a is either gray or white (unprinted). The gray-scale value of the gray tone may be, for example, 100 (if 255 is black). The content 22 of the document (e.g. text, graphics, image, etc.) is printed in black over the background pattern 21 (i.e. they overlap).

The size of the barcode tiles 21a is larger than the tile size of conventional 2d barcodes used in document authentication. In a conventional 2d barcode, the tile size may be as small as 5 to 7 pixels due to the need to minimize the tile size in order to maximize information density. In embodiments of the present invention, since the hierarchical barcode is used as a background pattern and the barcode tiles 21a are printed over by the document content, the barcode tiles preferably has a reasonable tile size so that most tiles are not completely obscured by the printed document content. The tile size is preferably chosen so that the binary value of most tiles can be read even when the tiles are partially obscured by the printed document content. In one example, the size of the tiles 21a is 60×60 pixels (with a resolution of 600 dpi); the barcode stamp element that form the hierarchical barcode has 21×21 tiles, and the barcode stamp element is multiplied with a 5 (vertical)×4 (horizontal) matrix by a Kronecker multiplication to form a hierarchical barcode having 105×84 tiles fitted with a letter-sized sheet. In another example, the size of the tiles 21a is 100×100 pixels (with a resolution of 600 dpi); the barcode stamp element that form the hierarchical barcode has 21×21 tiles, and the barcode stamp element is multiplied with a 3

(vertical)×2 (horizontal) matrix by a Kronecker multiplication to form a hierarchical barcode having 63×42 tiles fitted with a letter-sized sheet.

It should be noted that the sizes of the tiles 21a in FIG. 2 and the size of the content 22 are exaggerated for purpose of illustration. The exemplary hierarchical barcode 12 illustrated in FIG. 1 is used to construct the exemplary background pattern 21 in FIG. 2 (repeated three times). This is a much simplified example and is for illustration purpose only.

Although the background barcode pattern is shown in FIG. 2 as covering substantially the entire page, the background pattern may cover only a part of the page, for example, the barcode may only be present in empty spaces or margins on the page, in space between lines, etc.

As described earlier, the hierarchical barcode 21 is a Kronecker product of a barcode element and another matrix, which may be itself (see FIG. 1). The hierarchical barcode is redundant, making it more robust and easy to decode. Thus, for example, if some barcode tiles are obscured by the printed content and cannot be read, the values of other tiles (those that can be read) can be used and the hierarchical barcode can still be decoded.

Figure 3:
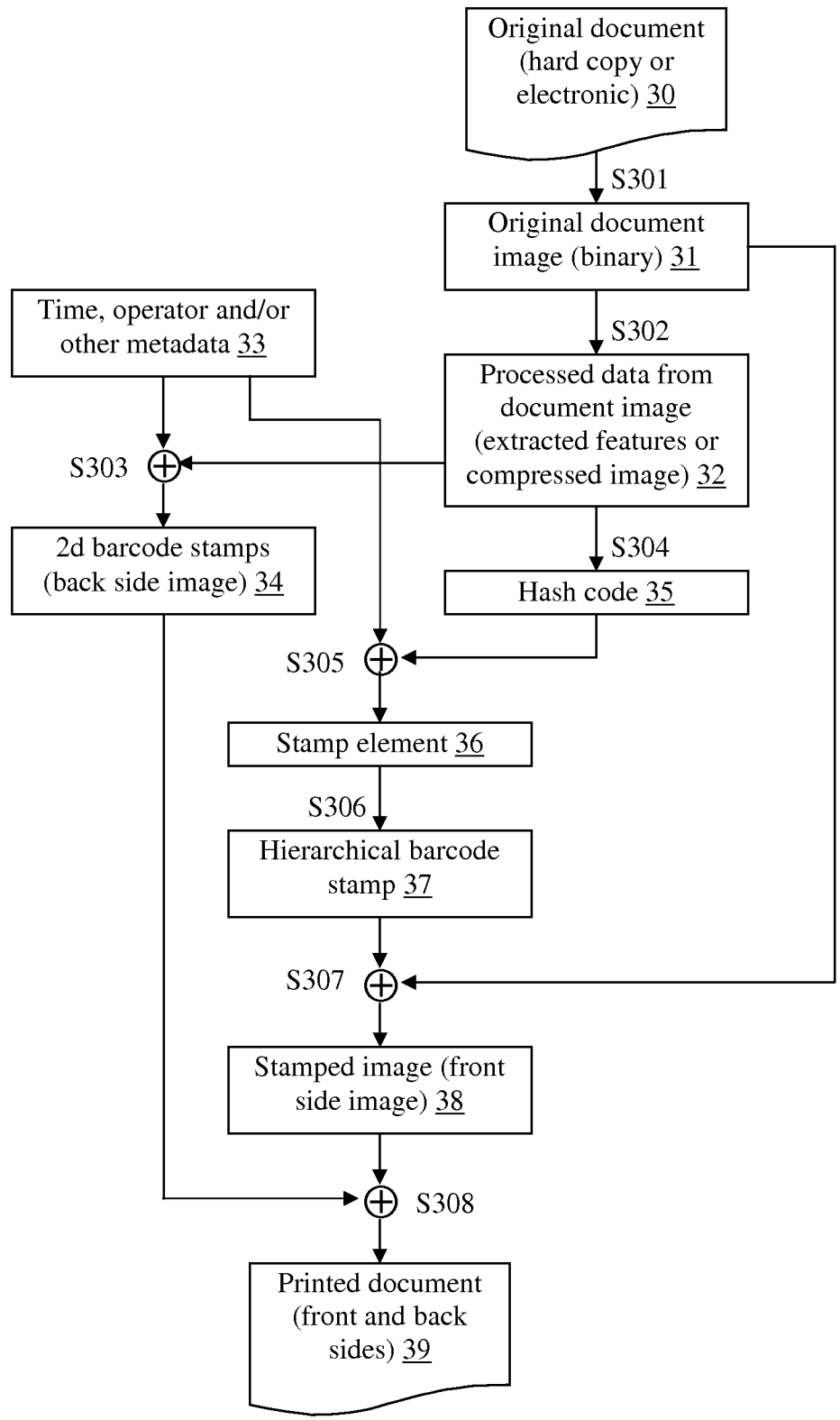
FIG. 3 schematically illustrates a method of generating a self-authenticating document according to an embodiment of the present invention.

FIG. 3 schematically illustrates an encoding and printing method according to an embodiment of the present invention for generating a self-authenticating document bearing a hierarchical barcode as a front side background pattern. As shown in FIG. 3, an original document 30, which may be in either hard copy form or electronic form, is processed to generate a binary original document image 31 (step S301). Step S301 may include scanning if the original document 30 is in a hard copy form, and may include thresholding if the scanned or original electronic document is a grayscale image.

The binary original document image 31 is processed to generate processed data 32 from the document image (step S302). The processing step may include extracting graphics or bitmap image objects from the document image, extracting text by an OCR technique, etc., in which case the processed data 32 are extracted features. Extracting features from a document image is a common step in many document authentication methods, and any suitable techniques may be used to implement this step. The processed data 32 may also be a lower spatial resolution version of the original document image. Alternatively, the processed data 32 may be a compressed version of the original document image itself. More generally, the processing step S302 processes the original document image 31 to reduce the data amount; any suitable processing may be applied. The processed data 32 is data generated by such a processing step and can be any suitable type of data.

The processed data 32 are then encoded into 2d barcode stamps 34 to be printed on the back side of the printed document (step S303). Optionally, desired metadata 33 relating to the printed document such as time information, operator information, etc. may also be encoded in the 2d barcode 34 along with the processed data (step S303).

As an alternative, the 2d barcode stamps may directly encode the original document image (uncompressed), in which case step S302 is not performed. However, the original document image typically involves a large amount of data, and it is often not practical to directly encode the original document image (without compression) in 2d barcodes.

In the mean time, a hash function is applied to the processed data 32 to generate a hash code 35 (step S304). Preferably, the hash code is reasonably short, such as 64, 128, or 256 bits, etc. A stamp element 36 is then generated from the hash code 35 (step S305). Optionally, the metadata 33 is also encoded in the stamp element along with the hash code (step S305). Then, a Kronecker operation is applied to the stamp element 36 to generate a hierarchical barcode stamp 37 (step S306). The hierarchical barcode stamp 37 may be a Kronecker product of the stamp element 36 and itself, or a Kronecker product of the stamp element 36 and a pre-defined matrix. Note here that the stamp element 36 and the hierarchical barcode stamp 37 may be in the form of matrices (e.g. data stored in the computer) and they are not necessarily 2-dimensional images of barcode stamps.

After the hierarchical barcode stamp 37 is generated, it is combined with the binary original document image 31 to generate a stamped image 38 to be printed on the front side of the printed document (step S307). The stamped image 38 has a background pattern that includes gray (printed) and white (unprinted) tiles representing the hierarchical barcode stamp 37. The binary (black and white) original document image 31 is superimposed on the background pattern. An example of a stamped image 38 is shown in FIG. 2.

The front side image 38 is printed on a front side of a recording medium and the 2d barcode stamps 34 are printed on the back side of the same recording medium to generate a printed document 39 (step S308).

Figure 4:
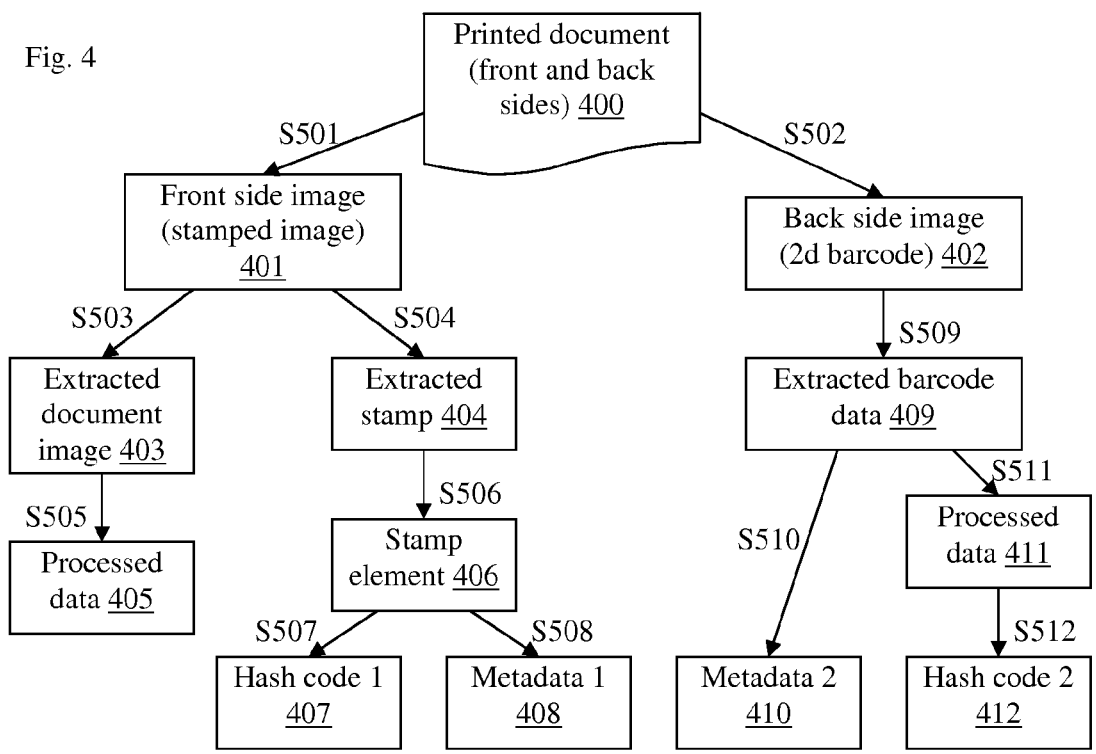
FIGS. 4 and 5 schematically illustrate a method of determining the authenticity of a printed document according to an embodiment of the present invention.
Figure 5:
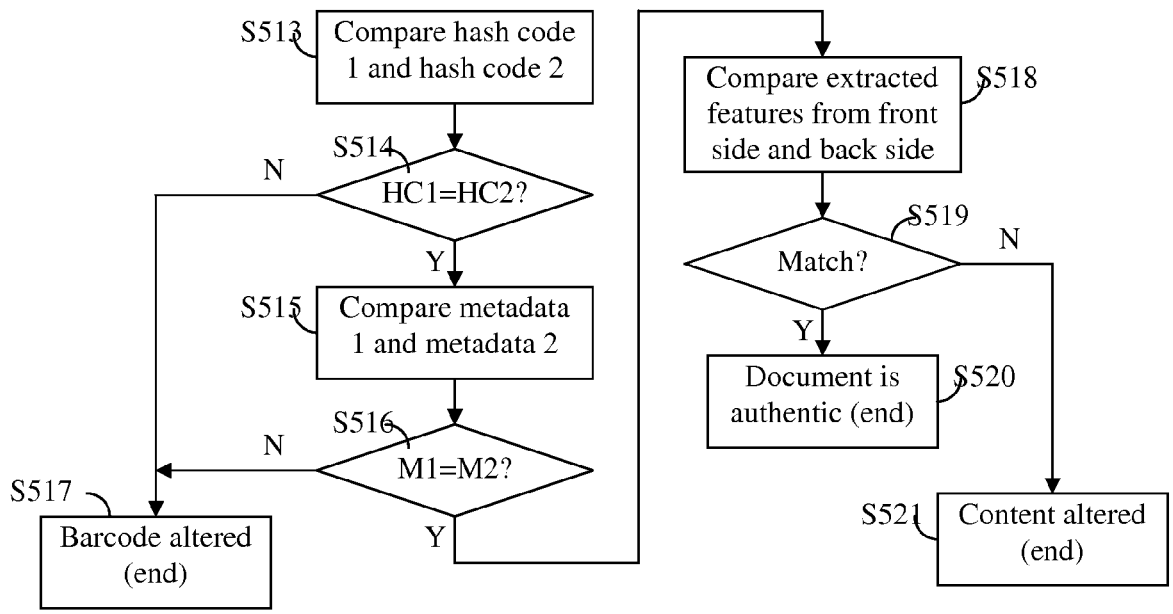

After the printed document 39 is released and circulated, the document or a copy thereof can be authenticated using a method illustrated in FIGS. 4 and 5. As shown in FIG. 4, both sides of the printed document 400 are scanned (steps S501 and S502) to obtain a front side image 401 and a back side image 402. The front side image 401 (purporting to be substantially the same as the front side image 38) is the stamped image containing a background pattern and the document content, and the back side image 402 contains 2d barcodes (purporting to be the same as the 2d barcode stamps 34). Here, "purporting to be the same" means that if the printed document has not been altered, then the relevant items in the printed document 400 will be substantially the same as the corresponding items in the printed document 39 (of course, certain artifacts may be introduced as a normal part of the printing and scanning process but they will not substantially change the images).

The front side image 401 is analyzed to extract the document image (content of the document) 403 (step S503) and to extract the hierarchical barcode stamp 404 (step S504). In steps S503 and S504, the hierarchical barcode stamp 404 may be distinguished from the document image 403 by the gray scale value of the pixels.

If, during the encoding and printing process (FIG. 3), step S302 includes extracting features from the original document image or generating a lower resolution version of the original document image, then the same extracting process is applied to the document image 403 to generate processed data 405. If step S302 only generates a compressed version of the original document image and does not include extracting features or generating a lower resolution version, then step S505 is not performed.

The extracted hierarchical barcode stamp 404 is further analyzed to extract the stamp element 406 (step S506). In a preferred implementation of steps S504 and S506, the authentication algorithm has a priori knowledge regarding the hierarchical barcode stamp, such as the tile size, the dimension (m and n) of the stamp element, the pre-defined matrix used in the Kronecker product (if any), etc. As mentioned earlier, many tiles of the hierarchical barcode will be obscured (partially or even fully) by the document content; the a priori knowledge of the hierarchical barcode stamp enables the algorithm to take advantage of the redundancy in the hierarchical barcode to accurately determine the value of the stamp element. Alternatively, information regarding the hierarchical barcode stamp such as the tile size, the dimension (m and n) of the stamp element, etc. may be encoded in the 2d barcode stamps 34, or in a separate barcode stamp printed on the front or back of the document. If the authentication algorithm does not have such knowledge about the hierarchical barcode stamp (either a priori or gained from a barcode stamp), then a more sophisticated matching algorithm is needed to determine the values of these parameters (tile size, m and n, etc.) that best match the observed data of the front side image 401.

Of course, during step S506, if the background pattern is found not to conform to a Kronecker product form consistent with the knowledge about the hierarchical barcode stamp, then it is determined that the document has been altered.

After the stamp element 406 is determined, it is decoded to obtain a hash code 407 and metadata 408 (if any) encoded therein (steps S507 and S508). The decoding process is the reverse of the encoding process of step S305.

Meanwhile, the 2d barcode 402 in the back side image is read to obtain the barcode data 409 (a bit stream) (step S509). As described earlier, the barcode data 409 encodes metadata (optional) and processed data 32, which may be extracted features from the original image, reduced resolution version of the original image, compressed version of the original image data, etc. generated in step S302. Thus, the barcode data 409 is decoded to obtain the metadata 410 and the processed data 411 encoded therein (steps S510 and S511). The decoding process is the reverse of the encoding process of step S303. The processed data 411 may include extracted features, reduced resolution version, compressed image, etc. A hash function (the same as the hash function used in step S304) is applied to the processed data 411 to calculate a hash code 412 (step S512).

Then, as shown in FIG. 5, a comparison process is carried out to determine the authenticity of the printed document 400. First, in step S513, the hash code 407 obtained from stamp element 406 (from the front side image) is compared to the hash code 412 obtained (calculated) from the 2d barcode 402 (from the back side image). If the two hash codes are different ("N" in step S514), it indicates that the 2d barcode has been altered, and the printed document 400 is judged to have been altered and not authentic (step S517).

If the two hash codes are the same ("Y" in step S514), the metadata 408 obtained from stamp element 406 (from the front side image) is compared to the metadata 410 obtained from the 2d barcode 402 (from the back side image) (step S515). If the two metadata are different ("N" in step S516), it again indicates that the 2d barcode has been altered, and the printed document 400 is judged to have been altered and not authentic (step S517). Steps S515 and S516 are optional and are performed if metadata has been encoded in the barcodes. Further, steps S515 and S516 may be performed before steps S513 and S514.

If the two hash codes are the same ("Y" in step S516) and the two metadata are the same ("Y" in step S516), the document image 403 obtained from the front side image 401 is compared to the processed data 411 obtained from the back side image 402 (step S518). This comparison step may have a number of alternative implementations depending on what type of data the processed data 411 includes. First, if the processed data 411 includes a compressed version of the original image, then the compressed data is decompressed to generate a document image, and a pixel-by-pixel image comparison may be performed against the document image 403. In such an embodiment, step S505 is not necessary. Second, if the processed data 411 includes extracted features or a lower resolution image, then these features are compared to the corresponding features in the processed data 405. If the document image 403 and the processed data 411 match each other based on this comparison ("Y" in step S519), the printed document 400 is judged to be authentic (step S520). Otherwise ("N" in step S519), the printed document 400 is judged to be altered and not authentic (step S520).

The document authentication scheme described above has many advantages. The hierarchical barcode stamp is tolerant of contaminations and resistant to temper due to its structural redundancy and hierarchical nature. Further, the hierarchical stamp is unlikely to be tempered with because of its presence as a background pattern on the front side of the document. In addition, hashing reduces the amount of information, which enables the barcode stamp element to be coded in a simple manner and improves the readability and robustness of the hierarchical barcode stamp. The authentication process requires three levels of comparison, which significantly improves the security of the authentication method.

In an alternative embodiment, the hierarchical barcode stamp is invisible for a human (naked eyes) during the time the document is in a hardcopy form. In such cases, the barcode stamp can be hidden in the front side of the document by using tint block technology. In particular, each tile of the stamp can be formed of invisible dispersed fine dots so that the barcode stamp can be detected or appear when the hardcopy document is scanned back to a digital form.

The document authentication method described above may be implemented by software or firmware stored in a memory and executed by any suitable data processing apparatus, such as a computer, a printer or scanner having a data processing section, etc. In this regard, computer executable software, which is codes for realizing the processes of FIGS. 3-5, may be stored in a computer memory accessed by a central processing unit (CPU) or a micro processing unit (MPU) of the suitable data processing apparatus. The printing and scanning steps may be performed by any printer and scanner, or an all-in-one device that combines a printing section and scanning section in a single device. The structures of these devices and apparatuses are well known and not described in detail here.

Alternatively, in lieu of a scanner, a digital camera or other imaging devices may be used in the steps S501 and S502. In this regard, the term "scanned image" as used in this disclosure and the claims broadly refers to a digital image generated by scanning or photography or other suitable methods.

It will be apparent to those skilled in the art that various modification and variations can be made in the alteration detection method and related apparatus of the present invention without departing from the spirit or scope of the invention. Thus, it is intended that the present invention cover modifications and variations that come within the scope of the appended claims and their equivalents.

What is claimed is:

1. A method implemented in a data processing and printing system for generating a self-authenticating printed document, comprising:
    (a) obtaining an original document image;
    (b) processing the original document image to generate processed data;
    (c) generating a barcode stamp element encoding a code calculated from the processed data generated in step (b);
    (d) generating a hierarchical barcode stamp by repeating the barcode stamp element in accordance with a predefined pattern;
    (e) printing the hierarchical barcode stamp and the original document image on a front side of a recording medium, wherein the hierarchical barcode stamp is printed with gray tone tiles and the original document image is printed in a black color, the hierarchical barcode stamp and the original document image overlapping each other such that at least some content of the original document image printed in the black color overlaps some gray tone tiles of the hierarchical barcode stamp.

2. The method of claim 1, wherein step (c) comprises:
generating a hash code from the processed data generated in step (b); and
generating the barcode stamp element which encodes the hash code; and
wherein step (d) comprises:
generating the hierarchical barcode stamp from the barcode stamp element by repeating the barcode stamp element in accordance with the pre-defined pattern.

3. The method of claim 1, wherein the processed data includes one or more of extracted graphics objects, extracted bitmap image objects, extracted text, a lower spatial resolution version of the original document image, and a compressed version of the original document image.

4. The method of claim 1, further comprising generating first barcode stamps which encode the processed data generated in step (b);
wherein step (e) further includes printing the first barcode stamps on a front or back side of the same recording medium to generate the printed document.

5. The method of claim 4, wherein the first barcode further encodes metadata relating to the printed document, and wherein in step (d) the hierarchical barcode stamp further encodes the metadata.

6. A method implemented in a data processing system for authenticating a printed document, the printed document including a hierarchical barcode stamp and a document image printed on a front side of a recording medium and first barcode stamps printed on a front or back side of the same recording medium, the method comprising:
(a) obtaining a front side image and a back side image from the printed document;
(b) extracting the document image and the hierarchical barcode stamp from the front side image;
(c) processing the document image extracted in step (b) to obtain first processed data;
(d) extracting a first code from the hierarchical barcode stamp extracted in step (b);
(e) reading and decoding the first barcode stamps in the front side image and/or the back side image to obtain second processed data encoded therein;
(f) calculating a second code from the second processed data;
(g) comparing the first code and the second code to determine whether the first barcode stamps have been altered; and
(h) comparing first processed data and second processed data to determine whether the printed document has been altered.

7. The method of claim 6, wherein the hierarchical barcode stamp forms a background pattern on the front side of the document and the document image overlaps the background pattern.

8. The method of claim 7, wherein the background pattern includes barcode tiles printed in a gray tone or unprinted, wherein the document image is a binary image printed in black, and wherein step (b) includes distinguishing gray pixels and black pixels in the front side image.

9. The method of claim 6, wherein step (d) comprises:
(d1) generating a barcode stamp element from the hierarchical barcode stamp, wherein the hierarchical barcode stamp comprises the barcode stamp element being repeated in accordance with a pre-defined pattern; and
(d2) decoding the barcode stamp element to obtain the first code.

10. The method of claim 6, further comprising:
(i) extracting first metadata from the hierarchical barcode stamp extracted in step (b);
(j) obtaining second metadata encoded in the first barcode stamps; and
(k) comparing the first metadata and the second metadata to determine whether the printed document has been altered.

11. The method of claim 6, wherein the first processed data includes one or more of extracted graphics objects, extracted bitmap image objects, extracted text, a lower spatial resolution version of the document image, and a compressed version of the document image.

12. A computer program product comprising a computer usable medium having a computer readable program code embedded therein for controlling a data processing apparatus, the computer readable program code configured to cause the data processing apparatus to execute a process for generating a self-authenticating printed document, the process comprising:
(a) receiving an original document image;
(b) processing the original document image to generate processed data;
(c) generating a barcode stamp element encoding a code calculated from the processed data generated in step (b);
(d) generating a hierarchical barcode stamp by repeating the barcode stamp element in accordance with a pre-defined pattern;
(e) controlling a printer to print the hierarchical barcode stamp and the original document image on a front side of a recording medium, wherein the hierarchical barcode stamp is printed with gray tone tiles and the original document image is printed in a black color, the hierarchical barcode stamp and the original document image overlapping each other such that at least some content of the original document image printed in the black color overlaps some gray tone tiles of the hierarchical barcode stamp.

13. The computer program product of claim 12, wherein step (c) comprises:
generating a hash code from the processed data generated in step (b); and
generating the barcode stamp element which encodes the hash code; and
wherein step (d) comprises:
generating the hierarchical barcode stamp from the barcode stamp element by repeating the barcode stamp element in accordance with the pre-defined pattern.

14. The computer program product of claim 12, wherein the processed data includes one or more of extracted graphics objects, extracted bitmap image objects, extracted text, a lower spatial resolution version of the original document image, and a compressed version of the original document image.

15. The computer program product of claim 11, further comprising generating first barcode stamps which encode the processed data generated in step (b);
wherein step (e) further includes printing the first barcode stamps on a front or back side of the same recording medium to generate the printed document.

16. The computer program product of claim 15, wherein the first barcode further encodes metadata relating to the printed document, and wherein in step (d) the hierarchical barcode stamp further encodes the metadata.

17. A computer program product comprising a computer usable medium having a computer readable program code embedded therein for controlling a data processing apparatus, the computer readable program code configured to cause the data processing apparatus to execute a process for authenticating a printed document, the printed document including a hierarchical barcode stamp and a document image printed on a front side of a recording medium and first barcode stamps printed on a front or back side of the same recording medium, the process comprising:
  (a) receiving a front side image and a back side image from the printed document;
  (b) extracting the document image and the hierarchical barcode stamp from the front side image;
  (c) processing the document image extracted in step (b) to obtain first processed data;
  (d) extracting a first code from the hierarchical barcode stamp extracted in step (b);
  (e) reading and decoding the first barcode stamps in the front side image and/or the back side image to obtain second processed data encoded therein;
  (f) calculating a second code from the second processed data;
  (g) comparing the first code and the second code to determine whether the first barcode stamps have been altered; and
  (h) comparing first processed data and second processed data to determine whether the printed document has been altered.

18. The computer program product of claim 17, wherein the hierarchical barcode stamp forms a background pattern on the front side of the document and the document image overlaps the background pattern.

19. The computer program product of claim 18, wherein the background pattern includes barcode tiles printed in a gray tone or unprinted, wherein the document image is a binary image printed in black, and wherein step (b) includes distinguishing gray pixels and black pixels in the front side image.

20. The computer program product of claim 17, wherein step (d) comprises:
  (d1) generating a barcode stamp element from the hierarchical barcode stamp, wherein the hierarchical barcode stamp comprises the barcode stamp element being repeated in accordance with a pre-defined pattern; and
  (d2) decoding the barcode stamp element to obtain the first code.

21. The computer program product of claim 17, further comprising:
  (i) extracting first metadata from the hierarchical barcode stamp extracted in step (b);
  (j) obtaining second metadata encoded in the first barcode stamps; and
  (k) comparing the first metadata and the second metadata to determine whether the printed document has been altered.

22. The computer program product of claim 17, wherein the first processed data includes one or more of extracted graphics objects, extracted bitmap image objects, extracted text, a lower spatial resolution version of the document image, and a compressed version of the document image.

* * * * *